United States Patent [19]

Sipman et al.

[11] Patent Number: 4,962,531

[45] Date of Patent: Oct. 9, 1990

[54] TRANSACTION SYSTEM COMPRISING ONE OR MORE HOST EXCHANGES AND A NUMBER OF DISTRIBUTED TERMINAL STATIONS

[75] Inventors: Wilhelmus H. M. Sipman; Lambertus Snel, both of The Hague, Netherlands

[73] Assignee: U.S. Philips Corporation, New York, N.Y.

[21] Appl. No.: 237,342

[22] Filed: Aug. 26, 1988

[30] Foreign Application Priority Data

Aug. 28, 1987 [NL] Netherlands .......................... 8702012

[51] Int. Cl.$^5$ .............................................. H04L 9/00
[52] U.S. Cl. ........................................ 380/24; 380/23; 380/30
[58] Field of Search ..................... 380/24, 25, 23, 30

[56] References Cited

U.S. PATENT DOCUMENTS

| | | | |
|---|---|---|---|
| 4,302,810 | 11/1981 | Bouricius | 380/24 |
| 4,423,287 | 12/1983 | Zeidler | 380/24 |
| 4,578,530 | 3/1986 | Zeidler | 380/24 |
| 4,691,355 | 9/1987 | Wirstrom et al. | 380/23 |
| 4,694,492 | 9/1987 | Wirstrom et al. | 380/23 |
| 4,731,842 | 3/1988 | Smith | 380/24 |
| 4,755,940 | 7/1988 | Brachtl | 380/24 |
| 4,771,461 | 9/1988 | Matyas | 380/24 |
| 4,802,218 | 1/1989 | Wright et al. | 380/23 |
| 4,809,326 | 2/1989 | Shigenaga | 380/23 |
| 4,862,501 | 8/1989 | Kamitake et al. | 380/25 |

FOREIGN PATENT DOCUMENTS 0193920 9/1986 European Pat. Off. .

Primary Examiner—Thomas H. Tarcza
Assistant Examiner—David Cain
Attorney, Agent, or Firm—Anne E. Barschall

[57] ABSTRACT

A transaction system comprises terminal stations which can communicate with a host exchange. In order to improve the communication, concentrators are arranged between the host exchange and the terminal stations. Given functions can be accommodated within the concentrators so that they need not be provided in the terminal station. The concentrators as well as the terminal stations are provided with a security box in order to realize encryption/decryption of the data transport; for the terminal station this box is preferably realized in the form of a smart card which acts as an operator identification element. A customer can identify himself by means of a user identification element, for example a magstripe card or a further smart card. The encryption mechanism is preferably DES.

17 Claims, 2 Drawing Sheets

TRANSACTION SYSTEM COMPRISING ONE OR MORE HOST EXCHANGES AND A NUMBER OF DISTRIBUTED TERMINAL STATIONS

BACKGROUND AND SUMMARY OF THE INVENTION

A transaction system, comprising a first number of distributed terminal stations, each terminal station comprising a first presentation location for receiving a portable user identification element and also bidirectional communication elements which enable physical communication with a user and which can receive, subject to a user identification being taken up and verification thereof in the transaction system, a user transaction request, wherein respective subsets of the terminal stations are each connected to a concentrator, various concentrators being interconnected by means of a network to one or more host exchanges, wherein each concentrator has protocol means for executing protocolled data transports with at least one host exchange and has cryptography means for exchanging said user transaction request and request granting information said at least one host exchange under execution of cryptographic operations on said data. There are generally two types of transactions of this kind. According to the first type, the user receives an amount of money (or bank notes) upon his request, which amount is charged against his account at a relevant host exchange. According to the second type, the user receives a service or product which is worth a given amount of money, which is charged against his account. The transaction is also possible in the other direction, so that the amount is credited to the account. However, the invention is by no means restricted by the nature of the transaction and in principle other types of transaction are also feasible, even transactions which are not expressed in money because they concern only the transport, for example the output, of information which may take place to an authorized user only.

In order to activate the transaction, a user presents a portable user identification element (smart card, magstripe card or the like) to the terminal station and identifies himself by means of, for example a so-called PIN code. A terminal station then comprises means for executing a physical bidirectional communication, such as a keyboard and a display element (and/or a printer) and, if necessary, a delivery mechanism for the money. The user identification element then contains identification information. The identity of the user is subsequently verified in that the user enters, for example a PIN code. After verification, the user can enter a transaction request. Alternatively this request may also be presented, for example, verbally. In that case there is provided, for example a voice recognition mechanism. There may be output in the form of speech. The communication between the terminal station and the host exchange must be encrypted by means of an encryption mechanism in one form or another. The protocols and procedures for the data transports to the various host exchanges usually differ (these host exchanges may be, for example different banks, or giro bank centres) and the facilities required in a terminal station for the above make the terminal station expensive; this is because a given amount of intelligence must be provided also for functions such as the checking and monitoring of the status of the network.

A system of the type set forth in the opening paragraph is known from EP application No. 68805, corresponding U.S. application Ser. No. 278001, herein incorporated by reference. Here, the terminal station has encryption means permanently provided, that could be accessed by fraudulent persons. It would be expensive to make the terminal station tamper proof there against.

Among other things, it is an object of the invention to simplify the terminal station so that only a limited number of communication facilities need be provided therein, such as a simple display element (a few alphanumerical positions suffice in most cases), a keyboard, and a read element for a user identification element, there also being provided facilities for introducing-/removing a simply constructed encryption/decryption element for the communication so that a terminal station is automatically protected against abuse when it is not in operation.

This object is achieved by a transaction system in accordance with the invention in that according to one of its aspects it is characterized in that, a terminal station, physically apart from said first presentation location comprises a second presentation location for receiving a portable operator identification element in order to execute data processing operations therein for communication with the associated concentrator by encryption/decryption, using data processing elements present in the operator identification element, on the basis of a key information for a so-called public algorithm present in the operator identification element.

The customer-oriented realization of the system is effected by the number of terminal stations. As a result of the invention, the terminal stations may be cheaper: the various protocols need now be implemented only in the concentrators. Moreover, the number of concentrators is smaller than the number of terminal stations, so that the network system can be simplified in many cases. Now there are often two cryptographic levels. At the level of the network system, a high reliability is required, however, this reliability is achieved by means of the already complex concentrators. Between the concentrators and the groups of terminal stations (typically 8–128) there is only required simpler cryptography which is realized in a so-called security box. This security box is now formed by the operator identification element. Without this operator identification element, a terminal station is completely unusable, so that the security is increased; this means that, for example, after business hours the terminal station may remain unattended, without unauthorized transactions being possible.

In itself, terminals for use with two different card categories have become known from EP application No. 193,920, corresponding JP application No. 4338685 priority Mar. 5, 1985 but there the operator card is inserted in the same slit as the user card, so the secret information is normally present in the terminal itself, and may thus be accessed, as long as the power is not cut down. Moreover, the data processing elements of the IC-card are no more locally available during normal use.

FURTHER ASPECTS OF THE PRESENT INVENTION

According to another aspect, the operator identification element can be used for clerical purposes in that various operators each have their own individualized operator identification element: each salesman can, for example, sum his own turn-over or the system can sum the turn-over separately for all salesmen. In a further elaborated system, several levels of operator identification elements may be provided. For example, the lowest level is then reserved for the sales persons as described above. The next-higher level is then reserved for the owner of a shop employing several sales persons, which owner can sum the turn-over for all sales persons, separately, for all sales persons together, and possibly also for each product group. Further levels can be created in a similar manner.

The invention also relates to a concentrator for use in such a transaction system. Such concentrators will usually serve a locally organized group of terminal stations, for example as present in a large department store. The invention also relates to a terminal station for use in such a transaction system. Because of their low cost, such terminal stations can be comparatively widely used. The invention also relates to an operator identification element for use in conjunction with such a terminal station. The operator identification element can be formed notably as a so-called smart card. Further aspects of the invention are described in the dependent claims.

BRIEF DESCRIPTION OF THE FIGURES

The invention will be described in detail hereinafter with reference to some Figures.

GENERAL SYSTEM DESCRIPTION

Figure 1:
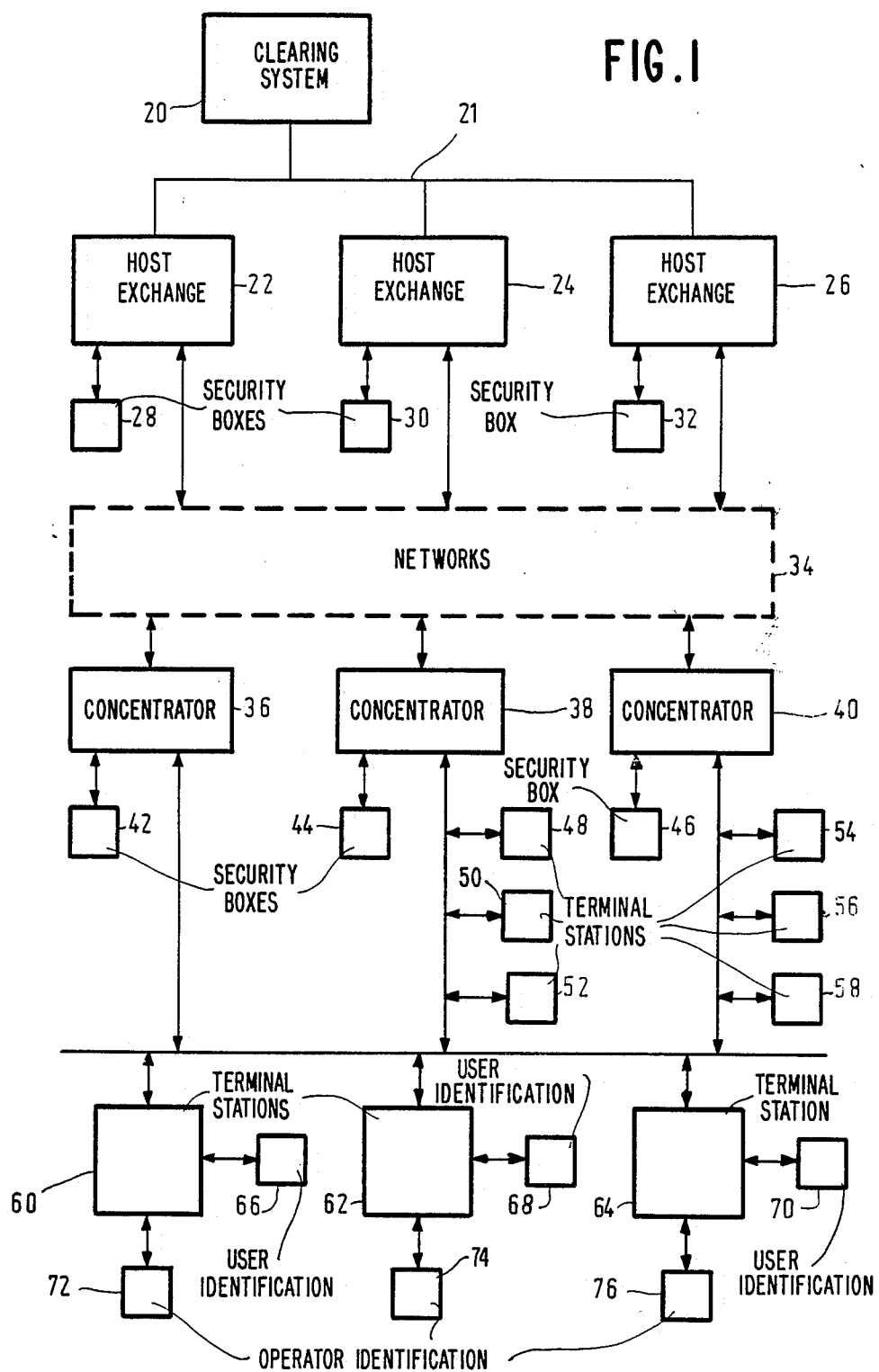
FIG. 1 is a general representation a transaction system in accordance with the invention.

FIG. 1 is a general representation of a transaction system in accordance with the invention. The present embodiment involves three host exchanges 22, 24, 26. These exchanges are, for example a giro bank centre, a bank giro centre and a clerical control system. The latter system controls and administrates, for example the output of the terminal stations, key information and the like; however, this will not be elaborated in the context of the present invention. Block 20 represents a compensation administration or clearing system which has only banking-technical implications and which will not be elaborated herein. The above exchanges are interconnected by means of a network 21. Via one or more networks (not shown) in the block 34 the exchanges 22, 24, 26 are connected to the concentrators 36, 38, 40. The transport via these networks is realized with encryption before and decryption after a transport. Encryption for a transport in the direction of the host exchange (exchanges) can be executed, if desired as an encryption supplementary to an encryption performed during a previous stage, and decryption for a transport from the host exchanges can be executed partly as a decryption preceding a further decryption to be performed at a later stage. On the other hand, the various encryptions/decryptions can also be performed fully independently.

Decryption requires secret key information. Many encryption/decryption algorithms are known per se. If desired, a second secret key may be used for encryption (the two keys should then be complementary). A further aspect of the security may be the use of a secret algorithm. Further aspects at another level may be the periodic changing of the key (or from one transaction to another), and the segmenting of the algorithm. In order to maintain the secret nature of the encryption, this operation (and also decryption) is performed in a "security box" which is present at all stations/exchanges mentioned thus far: 36, 38, 40, 22, 24, 26. Therein there is also provided the information of keys to be locally used, and possibly also algorithms, in such a manner they cannot be accessed outside the relevant security box, despite any, evidently unauthorized attempts. Such a facility is called tamper proof. In many cases electronic screens are provided which indicate mechanical tampering and which can initiate a complete or partial erase operation for secret information in response thereto. Inside the casing there may also be taken further steps which are known per se.

Each of the concentrators 36, 38, 40 is connected to three terminal stations: 48 . . . 64; the concentrators are diagrammatically represented by a single block, and the three terminal stations are shown more specifically. Each of the three terminal stations can communicate with two kinds of identification element, that is to say the user identification elements 66, 68, 70 and the operator identification elements 72, 74, 76. In a simple system the user identification elements are formed, for example by banker's cards provided with a magnetic strip on which data can be stored. Such a magstripe cards are in general use and will not be elaborated for the sake of brevity. They can be provided with additional security mechanisms. To this end, for example the information on the card can be coupled to a unique physical card characteristic. The terminal station comprises a slot for entering such a card, which slot accommodates a reader for the magnetic strip. In principle each customer may have one (or more) own user identification elements. In a more advanced system, the user identification element is formed by a so-called smart card on which there are provided a microprocessor, a read-only memory and a random access memory. The degree of security is then higher. Other cards can also be used, for example optically readable cards and hybrid cards (for example a card comprising a microprocessor and a memory as well as a magnetic strip).

There is also provided an operator identification element 72, 74, 76. This element can be presented to the terminal station in a suitable manner, for example also via an appropriate slot in the terminal station. The operator identification element has two functions. First of all, it can identify an operator (or an authorized person of the relevant organization) vis-á-vis the terminal station and hence vis-á-vis the system. Secondly, this element acts as a security box in the cryptographic organization between the terminal station and the concentrator. When the operator identification element is prematurely removed, the cryptographic mechanism between the relevant terminal station and the concentrator is disabled and hence also the communication. The operator identification element thus also has the function of a key. The respective procedures will be described hereinafter.

In an envisaged system the idea is to use from 3 to 4 networks, each having its own network protocols and possibly different security mechanisms, with 400 to 600 concentrators, each for a number of from 32 to at the most 128 terminal stations, so a total number of from 10.000 to 20.000 terminal stations. For communication there are provided standardized protocols and electrical connections such X.25, V24/RS232, I.S.O. 1745A and so on. For protection during authentification of messages there also exists a generally accepted standard, i.e.

ANSI 9.9. The system may be smaller so that it comprises, for example only one host exchange and from some tens to some hundreds of terminal stations. It may also be larger with tens of host exchanges and several $10^5$ terminal stations. Alternatively, further concentrators may be provided at a higher level.

GENERAL DESCRIPTION OF THE OPERATION OF THE SYSTEM

The system has three operational stages:

1. authentification/initialization between host exchange and concentrator. This stage is characterized by:
    a. authentification between host exchange and concentrator upon initialization and possibly during the subsequent operational period. The object is to ensure that the concentrator forms part of the authorized system.
    b. exchange of keys for the encryption between concentrator and host exchange, the whole procedure being protected by a master key. The master key may be present on a further smart card; this enables flexible key management. For the key management, for example the R.S.A. mechanism can be used.
    c. exchange of a black list containing invalidated identification elements; it may also concern a list with permitted operator identification elements. (For example, in the case of a concentrator which is suitable for 64 terminal stations (each of which is usually coupled via a separate line) and six permissible operator identification elements per terminal station, this list is a table comprising $6 \times 64 = 384$ permissible cards per concentrator).
2. Authentification/initialization between concentrator and terminal station. This stage is characterized by:
    a. authentification between terminal station and concentrator at the instant at which the retailer/cashier commences the starting and initialization of the money transfer machine (for example, an electronic cash register) for a limited period of time which amounts to at the most, for example 10 hours.
    b. exchange of the period key between concentrator and terminal station; the master key controlling this operation is present in the operator identification element (there may be several of such elements).
    c. despatch of result of check as regards terminal station and as regards cashier to host exchange.
    d. checking out the payment period, with delivery of final check data by host exchange.
3. Authentification/transaction between terminal station/customer/user identification element, to be referred to hereinafter as magnet card. This stage is characterized by:
    a. authentification/PIN verification of the customer by means of his magnet card via a route through or in the concentrator.
    b. execution of the order for payment.

The sequence of the operations in the case of electronic payment is as follows. It is assumed that all components are operational and that no errors occur.

Check-in/initialization phase:
a. The power supply for the terminal station and the electronic cash register (ECR) is switched on.

2. The operator identification element (SC) is inserted into the terminal station.
3. Using the check-in command (a button), the cashier checks in into the terminal station (can also take place automatically at the instant at which the operator identification element (SC) is inserted into the terminal station).
4. The terminal station transmits a unique check-in message associated with the relevant operator identification element (SC) to the concentrator.
5. The concentrator returns a value determined at random.
6. Using the data encryption standard algorithm, or DES algorithm, and the master key of the operator identification element, this value is encrypted and the result is subsequently despatched to the concentrator. The DES algorithm is described in Federal Information Processing Standards "Data Encryption Standards", Publication 46, Jan. 15, 1977, U.S. Department of Commerce Springfield, Va., 22161. The RSA algorith, is another possibility.
7. Because the concentrator knows which user identification element has started the relevant session, the message can be decrypted and verified after reception.
8. Subsequently, the concentrator despatches, using the known or an associated master key, a session key thus encrypted to the terminal station (calculation of session key by means of random value is an alternative).
9. The terminal station is then ready to execute an electronic payment instruction and informs the host exchange that it is ready, by means of a message via the concentrator, including a statement of the unique cashier number for this session.

Payment phase:
1. Via a function key on the electronic cash register (ECR), the cashier enables the money transfer machine (the terminal station) after the customer has indicated that he wishes to pay electronically.
2. The cashier transfers the total amount to be paid, simultaneously with the instruction "electronic payment" (the function key), to the terminal station.
3. A display element of the terminal station displays the total amount and the instruction to insert the user identification element.
4. The customer inserts the user identification element into or through the reader.
5. Via the display element the terminal station requests the PIN code.
6. The customer enters the PIN code.
7. The terminal station despatches the message containing the data recorded on the magnetic card (MGK data) and the encrypted PIN code, the message being provided with a MAC (message authentication code according to the ANSI 9.9 standard) to the concentrator or host exchange, depending on how and where the PIN verification and the processing of the MGK data must take place; this is determined inter alia by the instructions of the banking organization etc. managing the relevant host exchange.
8. After approval of the PIN code, an instruction is returned with the question whether the customer (user) agrees with payment of the total amount displayed on the display element; the latter element displays, for example the question: agreed?.
9. After the customer has pressed the agreed button, the sales slip is printed (standard data, for example name of company, date have already been printed) after a preceding payment session, so that the delay due to printing is minimum.

10. The agreed command is despatched to the host exchange.

11. After confirmation of reception the terminal station releases the ECR again for a next electronic payment.

Check out phase:

1. The cashier indicates that his session is to be terminated by pressing the check in/out function key.

2. The terminal station despatches a check out command to the concentrator and the host exchange.

3. The host exchange sends the sum of the payments made during the relevant session to the terminal station where it is printed, together with relevant administrative data. (This sum is possibly verified vis-á-vis a total amount stored in the terminal station.)

4. The concentrator re-initializes itself in preparation of a new session and requests an operator identification element, be it that this takes place only when the power supply voltage for the terminal station remains switched on; otherwise it awaits a check-in message from the terminal station.

DESCRIPTION OF A TERMINAL STATION

Figure 2:
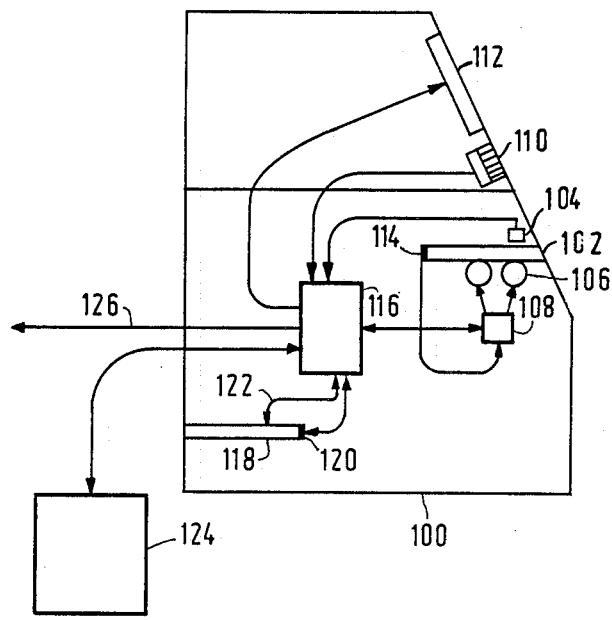
FIG. 2 shows a simplified diagram of a terminal station.

FIG. 2 shows a simplified diagram of a terminal station. The housing 100 comprises a number of input/output devices/interfaces for communication with a user at the right-hand side. Element 102 is a slot for presenting a pay card (user identification element) provided with a magnetic strip. There is provided a read element for the digital data present in the magnetic strip, drive rollers 106 for the card, a motor 108 for the drive rollers, a keyboard comprising, for example sixteen keys for entering decimal digits, approval and reject signals and possibly other signals, and a display element 112 for alphanumerical text. Element 114 is a microswitch for forming a stop command for the motor 108 when the card has been completely inserted. The elements 108, 104, 110, 112 are connected to the local processor 116. The reference numeral 118 denotes a slot for a smart card (operator identification element) and the reference numeral 120 denotes a microswitch or optical detector for detecting the presence of the fully positioned card. The element 120 and a line 122 for communication with the smart card are also connected to the processor 116. There are also shown an electronic cash register (being specific for the above application) 124 and a line for connection to the concentrator. There are also provided (not shown) a connection for a printer, a spare connection with RS232 interface and some status indicators concerning status tests. If desired, the slot 118 may be situated behind a door or be semi-hidden in another way. The electronic cash register will not be described for the sake of brevity.

THE OPERATOR IDENTIFICATION ELEMENT

The operator identification element acts as a security box for the terminal station in order to perform the relevant encryption/decryption operations. It also acts as an identification element for an operator (cashier, salesman, and the like). Outside business hours the terminal station can thus be deactivated by removal of the operator identification element. The operator identification element may be formatted as a box having, for example the dimensions of a pocket calculator (for example, length 10-20 cm, width 2-10 cm, thickness 1-10 mm). It includes a microprocessor, a memory and I/O components. There is provided a protection mechanism, for example as previously described for a security box. Notably the key and the operator identification information may not become available to the environment. Furthermore, the box may comprise a display element, a keyboard, calculation functions and so on.

Alternatively, the operator identification element complies with the electronic payment card standard which has actually been proposed as a user identification element. The standard concerns the dimensions, the electronic interfaces and the like. Such a payment card with built-in DES algorithm is described in the previous, non published French Patent Application No. 8703083 (870306) PHF 87.514) which corresponds to U.S. patent application Ser. No. 164,674 filed Mar. 7, 1988 which is incorporated herein by way of reference. The special use of the operator identification element, however, is not described therein. In such a card notably the microprocessor and the storage for secret information are integrated in a single integrated circuit, so that the tapping of bond pads and the like does not give access to this secret information.

The presentation position for the operator identification element is adapted to the dimensions of the latter element. An operator identification element does not offer advantages to a fraudulent customer per se, because its own authentification must still take place at least partly in the concentrator by means of a correct user identification element. This holds good even if such a customer possesses the code for identifying himself as a cashier. Abuse is of course possible, but this does not concern the undue recording of payments: this operation always requires a (stolen) user identification element with associated PIN code. In that case the normal route via the cashier can be used.

What is claimed is:

1. A transaction system comprising:
   (a) at least one host exchange;
   (b) a network;
   (c) a plurality of concentrators, coupled with the at least one host exchange via the network, each concentrator comprising:
      (i) protocol means for executing protocolled data transports with at least one host exchange; and
      (ii) cryptography means for performing cryptographic operations on and exchanging:
         (A) user transaction requests; and
         (B) request response information; with said at least one host exchange;
   (d) a first number of distributed terminal stations, respective subsets of the plurality of terminal stations each being associated with a respective one of the concentrators, each terminal station comprising
      (i) a respective first presentation location for receiving a portable user identification element; and
      (ii) respective bidirectional communication elements for
         (A) receiving a respective user transaction request from a user, subject to receipt and verification of the user identification element,
         (B) transmitting the respective transaction request to the respective one of the concentrators,
         (C) receiving respective request response information from the respective one of the concentrators, and (D) transmitting the respective request response information to the user; and (e) at least one second presentation location, associated with at least one respective terminal station but physically separate from the respective at least one first presentation location, for receiving a portable operator identification element containing data processing elements and key information for a so-called public algorithm, so that the at least one terminal station uses the data processing elements and the key information for (i) performing encryption operations with respect to the respective user transaction request prior to transmitting the respective user transaction request; and (ii) performing decryption operations with respect to the respective request response information after receiving the respective request response information.

2. A transaction system as claimed in claim 1, characterized in that there is provided a bookkeeping mechanism for the bookkeeping, under the control of individualized data present in the operator identification element, of transactions coupled thereto.

3. The system of claim 1 wherein said second presentation location is part of at least one of the distributed terminal stations, and said second presentation location is physically apart from said first presentation location within the at least one terminal station which includes said second presentation location.

4. A transaction system, comprising:
(a) at least one host exchange;
(b) a network;
(c) a plurality of concentrators, coupled with said at least one host exchange via the network, each concentrator having
 (i) respective protocol means for executing protocolled data transports with the at least one host exchange, and
 (ii) respective cryptography means for performing cryptographic operations and for exchanging
  (A) user transaction requests, and
  (B) request response information with the at least one host exchange,
(d) a plurality of distributed terminal stations, respective subsets of the plurality of terminal stations each being associated with a respective one of the concentrators, at least one of the terminal stations comprising
 (i) a respective first presentation location for receiving a portable user identification element,
 (ii) respective bidirectional communication elements for
  (A) receiving a respective user transaction request from a user, subject to receipt and verification of the user identification element,
  (B) transmitting the respective user transaction request to the respective one of the concentrators,
  (C) receiving respective request response information from the respective one of the concentrators, and
  (D) transmitting the respective request response information to the user; and
 (iii) a respective second presentation location, physically apart from said respective first presentation location, for receiving a portable operator identification element containing data processing elements and key information for a so-called public algorithm, so that the terminal station uses the data processing elements and the key information for:
  (A) performing encryption operations with respect to the respective user transaction request prior to transmitting the respective user transaction request; and
  (B) performing decryption operations with respect to the respective request response information after receiving the respective request response information.

5. The system of claim 4 further comprising means for tracking transactions, under control of individualized data present in the operator identification element.

6. The system of claim 4 further comprising a third presentation location, for receiving a second operator identification element, said third presentation location being disposed at a higher level than said second presentation location, said system outputting comparatively general information under control of said second operator identification element, and outputting comparatively specific information under control of said first operator identification element, said general information including said specific information.

7. A concentrator for use in a transaction system, the concentrator comprising:
 a first connection for coupling with one of a plurality of host exchanges via a network;
 a second connection for coupling with a plurality of terminal stations;
 protocol means for executing protocolled data transports with at least one of the host exchanges;
 cryptography means for exchanging user transaction requests and request granting information with said at least one host exchange under execution of cryptographic operations on said data; and
 means for connecting a local security box in order to execute a public key algorithm therein for at least partial encryption/decryption as part of a verification procedure for respective operator identification information and respective user information presented to respective ones of the terminal stations, after the latter information has been encrypted in the one terminal station,
 so that absent the respective operator information, the concentrator does not accept user requests from the terminal stations.

8. The concentrator of claim 7 wherein the connecting means comprises a presentation location, for receiving a portable master operator identification element in order to execute data processing operations for communication with an associated host by encryption/decryption, using data processing elements present in the master identification element, on the basis of a key information for a so-called public algorithm present in the operator identification element.

9. A terminal station for use in a transaction system, the terminal station comprising:
(a) a first presentation location for receiving a portable user identification element;
(b) bidirectional communication elements for
 (i) receiving a user transaction request from a user, subject to receipt and verification of the user identification element,
 (ii) transmitting the user transaction request to a host exchange or a concentrator, (iii) receiving request response information from the host exchange or concentrator, and (iv) transmitting the request response information to the user; and (c) a second presentation location, physically apart from said first presentation location, for receiving a portable operator identification element containing data processing elements and key information for a so-called public algorithm, so that the terminal station uses the data processing elements and the key information for (i) performing encryption operations with respect to the user transaction request prior to transmitting the user transaction request; and (ii) performing decryption operations with respect to the request response information after receiving the request response information.

10. The terminal station of claim 9 further comprising means for deactivating the terminal station when said operator identification element is removed.

11. A portable operator identification element comprising:

(a) data processing means for executing encryption/decryption operations according to a public algorithm;

(b) means for protective storage of a relevant key; and (c) communication means for bidirectional communication with one of an element of a transaction system, so that the operator identification element is suitable for acting as a security box for the element of the transaction system.

12. The operator identification element of claim 11, wherein:

(a) the operator identification element is a smart card; and (b) the data processing means and the protective storage means are accommodated in a single integrated circuit.

13. The operator identification element of claim 11 wherein the element of the transaction system is a terminal station.

14. The operator identification element of claim 11 wherein the element of the transaction system is a concentrator.

15. A transaction system, comprising:

(a) at least one host exchange;

(b) a network; and (c) a first number of distributed terminal stations, at least one of the terminal stations comprising (i) a first presentation location for receiving a portable user identification element, (ii) bidirectional communication elements for:

(A) receiving a user transaction request from a user, subject to receipt and verification of the user identification element, (B) transmitting the user transaction request to the host exchange via the network, (C) receiving request response information from the host exchange via the network, and (D) transmitting the request response information to the user; and (iii) a second presentation location, physically apart from said first presentation location, for receiving a portable operator identification element containing data processing elements and key information for a so-called public algorithm, so that the terminal station uses the data processing elements and the key information for (A) performing encryption operations with respect to the user transaction request prior to transmitting the user transaction request; and (B) performing decryption operations with respect to the request response information after receiving the request response information.

16. The apparatus of claim 1, 4, 9, or 15 wherein (a) said encryption operations comprise completely encrypting; and (b) said decryption operations comprise completely decrypting.

17. The apparatus of claim 1, 4, 9, or 15 wherein the terminal station uses the operator identification element as a security box.

* * * * *